Nov. 25, 1952  E. L. WALTERS  2,619,098
APPARATUS FOR WASHING GLASS SHEETS
Filed April 17, 1945  5 Sheets-Sheet 1
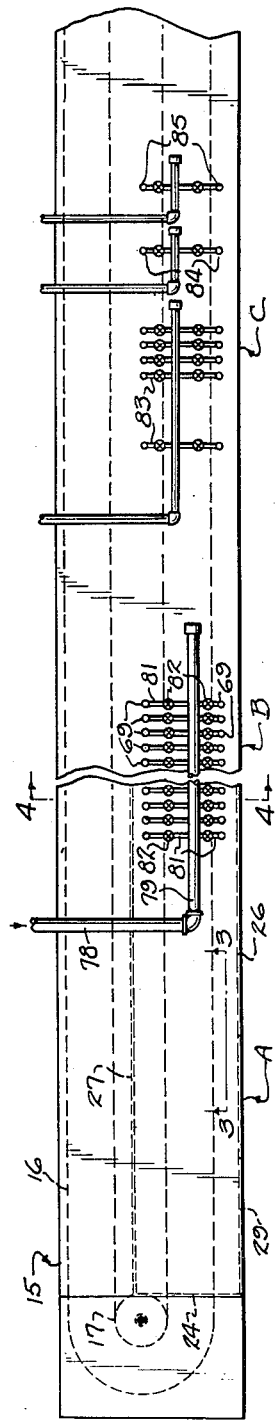
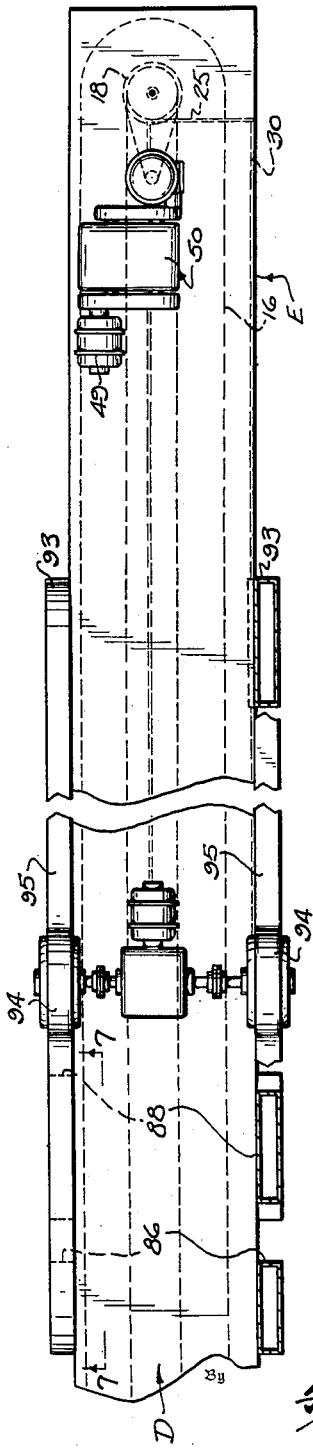
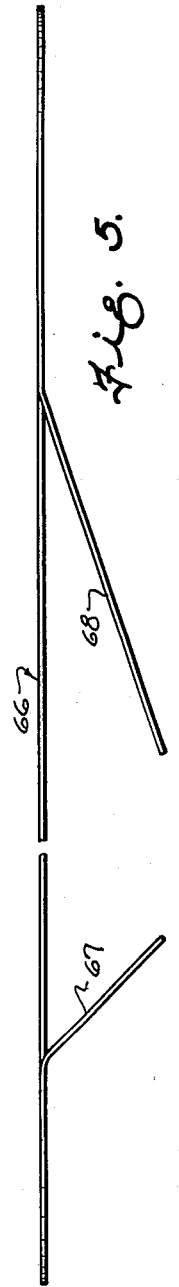
Inventor
EMMETT L. WALTERS.
Frank Fraser
Attorney Nov. 25, 1952     E. L. WALTERS     2,619,098
APPARATUS FOR WASHING GLASS SHEETS Filed April 17, 1945     5 Sheets-Sheet 4

Inventor
EMMETT L. WALTERS.
By Frank Fraser
Attorney

Nov. 25, 1952 E. L. WALTERS 2,619,098
APPARATUS FOR WASHING GLASS SHEETS

Filed April 17, 1945 5 Sheets-Sheet 5

Inventor
EMMETT L. WALTERS
By Frank Fraser
Attorney

Patented Nov. 25, 1952

2,619,098

UNITED STATES PATENT OFFICE 2,619,098

APPARATUS FOR WASHING GLASS SHEETS

Emmett L. Walters, Toledo, Ohio, assignor to Libbey-Owens-Ford Glass Company, Toledo, Ohio, a corporation of Ohio Application April 17, 1945, Serial No. 588,820

7 Claims. (Cl. 134—64)

The present invention relates to the cleaning or washing of articles or sheets of material, and has particular reference to a novel type of apparatus that is especially adapted for washing curved or bent sheets and plates of glass or the like.

In the past a very large percentage of the sheet glass used commercially was flat glass, and flat sheets are of course readily adaptable to machine washing. Various methods have been developed for the purpose but, generally speaking, flat glass has always been washed mechanically by passing the sheets to be cleaned between oppositely disposed pairs of brushing or rubbing elements, while flooding the glass with water and a suitable cleaning substance. During passage through the machine the sheets are scrubbed clean by the combined action of the cleaning agent and the frictional contact of the mechanical cleaning means.

This sort of procedure, however, does not lend itself satisfactorily to the washing of bent or curved glass sheets. Even with sheets that are curved in only one direction, too much difficulty is experienced in feeding successive sheets between the mechanical cleaning or scrubbing members. A set-up that will handle one type or degree of curvature is not suitable for sheets having different kinds of bends; and it is out of the question to effectively wash glass sheets that are bent in two directions by passing such two-way bent glass between pairs of any ordinary brushes or other mechanical cleaning members. As a consequence, glass sheets produced with compound bends have, heretofore, had to be cleaned by hand.

In fact, in the plants of the assignee company prior to the present discovery, bent glass sheets were put through a number of cleaning or washing procedures both before and after bending, but it was always considered necessary to finish up with a final hand cleaning with Bon Ami, especially in cleaning the contact surfaces for laminated safety glass production, where it is essential that the glass be exceptionally clean and free from all grease, dirt, dust and foreign matter of any kind.

It is an aim of this invention to provide a type of washing equipment with which glass sheets, either flat or bent, and even those of compound or dish-shaped curvature, can be put into one end of the machine dirty, and taken out of the other end spotlessly clean, dry, and ready to be laminated.

This is made possible by a special type of washing apparatus that employs a new and different washing technique. Briefly stated, this novel washing technique involves bombarding the sheets of glass to be cleaned with tiny particles of a relatively hard but non-glass abrasive material suspended in a liquid. It has been found that when such particles are thrown against the glass with sufficient force, they will literally knock the dirt loose from the glass surface, and that the dirt is then carried away by the water or other liquid in which the particles are suspended, or by subsequent rinsing, leaving the sheets perfectly clean.

Among its objects, the invention contemplates the provision of a complete sheet glass washing machine of novel character including special conveying and supporting means for carrying the glass sheets through the machine, novel means for holding or retaining the sheets on the conveyor during treatment, and for releasing them thereafter; and special spray equipment for projecting cleaning and rinsing materials onto the sheets.

Other objects and advantages of the invention will become more apparent during the course of the following description, when taken in connection with the accompanying drawings.

In the drawings, wherein like numerals are employed to designate like parts throughout the same:

Fig. 1 is a plan view of the entrance or forward half of the washing machine;

Fig. 2 is a continuation of Fig. 1, showing the rear or exit half of the machine;

Fig. 5 is a front elevation of the glass holder slide track;

Figure 4:
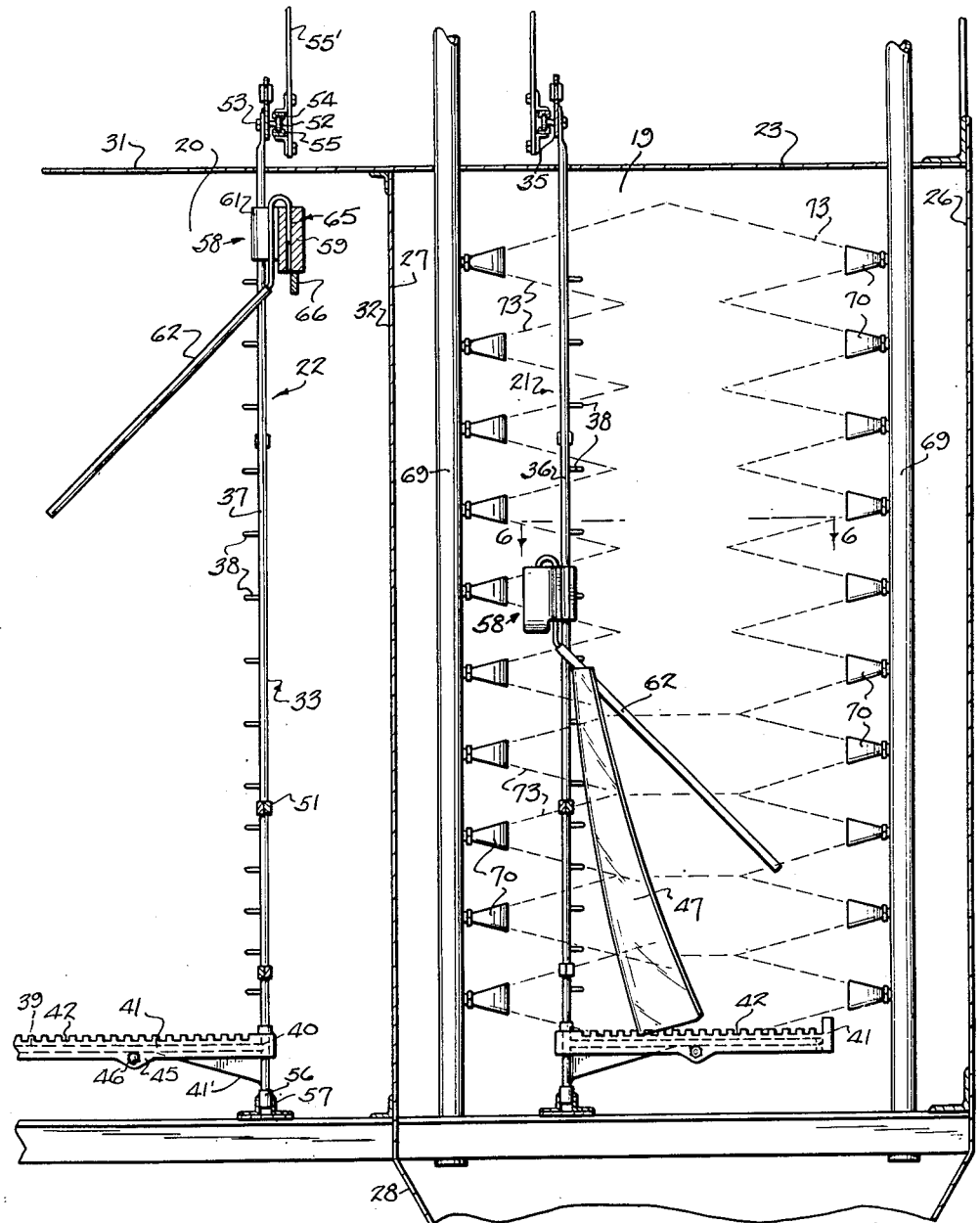
Fig. 4 is a transverse section through the machine taken substantially on the line 4—4 in Fig. 1.

Referring now more particularly to the drawings, the complete washing machine constructed in accordance with the invention is best illustrated in Figs. 1 and 2. As there shown, the machine comprises an elongated tunnel, designated in its entirety by the numeral 15, within which is mounted an endless conveyor 16, trained about sprockets 17 and 18, and upon which glass sheets are carried through the machine for cleaning. The tunnel 15 is made up of two longitudinally extending chambers 19 and 20, arranged side by side as shown in Fig. 4, with the glass conveying flight 21 of the conveyor 16 arranged within the front chamber 19, and the return flight 22 arranged within the rear chamber 20.

The front chamber 19 is a substantially closed one, being provided with a top wall 23, end walls 24 and 25, front wall 26, rear wall 27, and a hopper shaped bottom 28. The hopper bottom may be divided or partitioned at a plurality of points throughout the length of the tunnel 15 in order to keep the cleaning suspension, rinse water and so forth, that flow down out of the machine, separated from one another. Arranged in the front wall of the chamber 19, adjacent the entrance and discharge ends, are openings 29 and 30 respectively which are provided to permit glass sheets to be placed upon and removed from the conveyor 16.

The rear chamber 20 is open at its ends and to the rear but is provided with a roof portion 31 by an extension of the top of the chamber 19, and with a front wall 32 by the back wall 27 of the chamber 19, which wall acts as a partition between the two chambers.

Figure 3:
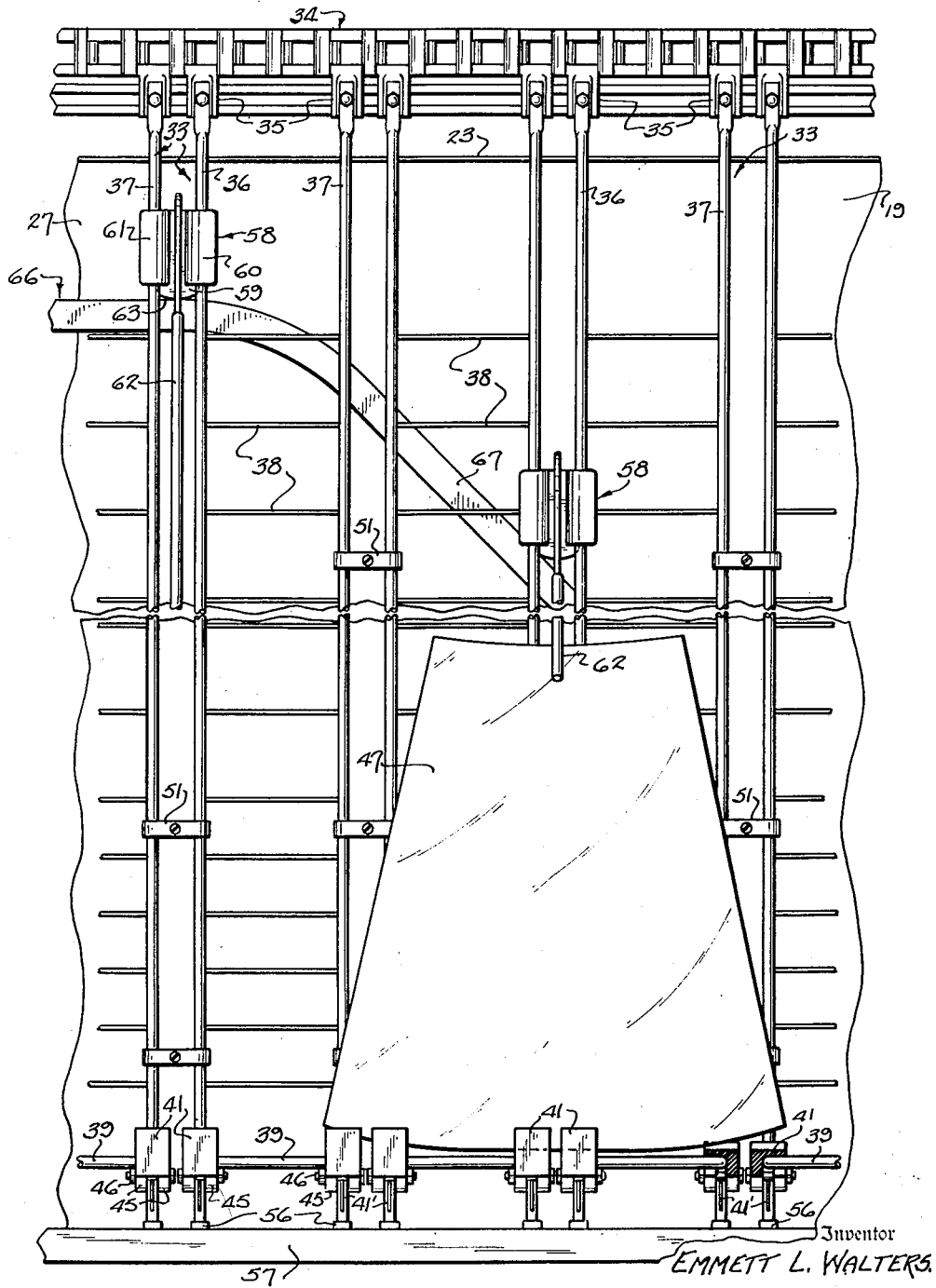
Fig. 3 is a fragmentary longitudinal section through the washing machine, taken substantially on the line 3—3 in Fig. 1.

The conveyor 16 is substantially L shaped in cross section (Fig. 4), being made up of a series of ladder-like members 33 suspended from an endless chain 34 (Fig. 3). The chain 34 is the part of the conveyor 16 that is trained about the sprockets 17 and 18, and carries attachments or depending portions designated 35 in Fig. 3 of the drawings. The ladder-like members 33 referred to above are each made up of a pair of metal rods 36 and 37, forming the uprights and bolted at their upper ends to the attachments 35 on the chain 34; and wires 38, forming the rungs of the ladder. Each pair of uprights or rods 36 and 37 is connected together adjacent their lower ends, by means of another rod 39, bent into a substantially square U shape and arranged in the horizontal plane with its ends soldered to the legs of the uprights 36 and 37 as shown at 40 (Fig. 4).

Figure 6:
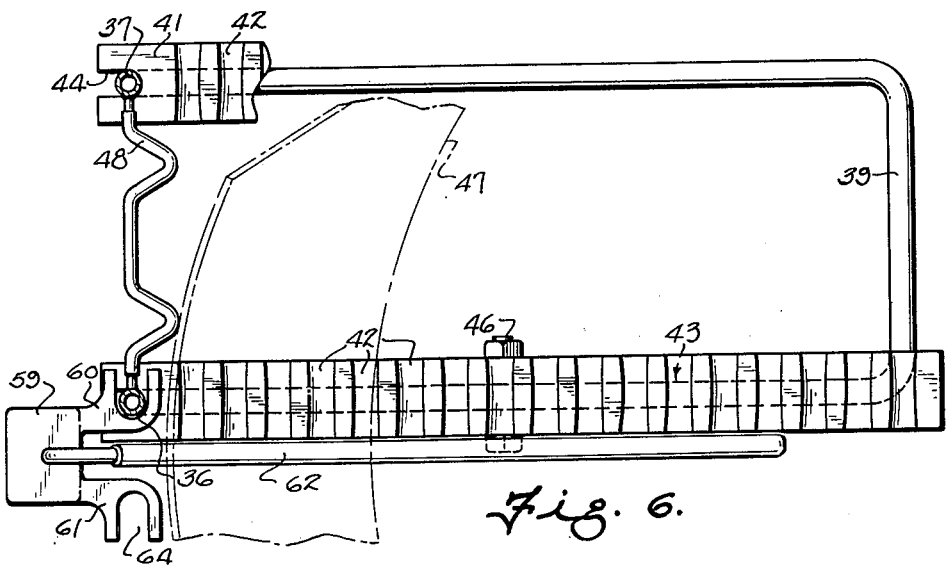
Fig. 6 is a sectional plan view of one section of the supporting and conveying means with its associated glass holder, taken substantially on the line 6—6 in Fig. 4.

These U-shaped extensions from the uprights 36 and 37 are what really support the glass sheets and for this reason they are provided with the strengthening ribs 41'. In order to cushion the glass edges from the metal rod 39 and to properly position the sheet on the conveyor, narrow, rubber mats 41 are provided to fit over the legs of the rods. These mats are provided with laterally extending glass receiving grooves 42 on their upper surfaces, and the walls of the grooves are preferably curved in the direction of their length as shown in Fig. 6 to accommodate various shapes of sheets. To insure their remaining in place, the mats 41 are provided with longitudinal grooves 43 on their under sides to fit over the legs of the U-shaped rod 39, and with vertical slots 44 at their rear edges to fit around the vertical or upright rods 36 and 37. In addition, each mat 41 has formed on its bottom surface a pair of oppositely disposed ears 45 through which a bolt 46 may be passed and tightened to cause the mat to snugly and securely engage the rod 39.

As best shown in Figs. 3, 4 and 6, in placing a glass sheet to be cleaned on the conveyor 16, the lower edge of the sheet 47 is put into one of the grooves 42 on one or more of the mats 41, while the back face of the sheet 47 rests against one or more of the wires or "rungs" 38. It is desired that the wires 38 be coated with rubber or other soft resilient material as shown at 48 in Fig. 6 to protect the surface of the glass, and for sheets with some shapes of bottom edges it may be desirable to remove some of the mats 41 to accommodate them. This can be readily done by unbolting the mats and then slipping them off of the supporting rod 39.

The conveyor 16 is adapted to be driven by driving the sprocket 18 at the exit end of the tunnel, and around which the chain 34 is trained. The sprocket is driven from a motor 49 through suitable reduction gearing 50 and, in order to have the entire conveyor drive as a unit, the ladder-like members 33 are connected to one another by means of the ties 51. To further promote smooth travel of the conveyor, wheels 52 journaled onto the ends of the bolts 53 are received, and roll within, oppositely disposed channel guides 54 and 55 carried by overhead supports 55'; and the lower ends of the rods or uprights 36 and 37 are provided with caps 56 sliding within channels 57.

Once a glass sheet has been introduced into the machine through the opening 29 and placed upon the conveyor 16 in the manner described above, it then becomes necessary to anchor the glass to the conveyor securely enough to retain it in position against the action of the blasts of liquid and cleaning particles that it will encounter during passage through the machine. At the same time the entire surface of the glass must be exposed to such blasts at all times, and the holding means must grip the glass and subsequently release it with little or no attention from the operator.

To this end a glass holder 58 is mounted for vertical sliding movement between every other one of the ladder-like members 33 (Figs. 3 and 4). As best shown in Figs. 3 and 6, each glass holder 58 is made up of a body portion 59, a pair of spaced forwardly extending arms 60 and 61, and a glass engaging rod 62.

The body portion 59 is square in horizontal cross section and rectangular in vertical section with a rounded bottom portion 63. The arms 60 and 61 extend first forwardly and then laterally, terminating in bifurcated portions 64 arranged back to back and embracing adjacent rods 36 and 37 on different members 33, so that the holders 58 will be maintained in proper position at the same time that they are permitted to move freely in a vertical path.

The glass engaging rod 62 fits into a vertical opening 65 in the body portion 59 of the holder, extends out of the top and is bent downwardly and then outwardly at an angle, as shown at the left in Fig. 4. To protect the glass sheet, the angular stretch of the rod 62 is coated with rubber or the like and, when this coated rod is in contact with the glass as shown at the right hand in Fig. 4, it will be noted that it contacts only the sharp edge of the glass sheet. Nevertheless, because of the weight of the holders 58 and the wedging action that takes place between the grooved mat 41, the rubber covered wires 38, and the rod 62, the glass sheet will be found to be firmly held in position.

In order to automatically clamp the sheet onto the conveyor 16 shortly after it has been placed thereon, and to release the holding means just before it is time to remove the glass sheet from the conveyor, there is arranged within the tunnel 15 a glass holder slide track 66 (see Figs. 3, 4 and 5). This slide track consists of a metal bar bar or strip in the form of a partially open loop positioned to coincide with the path of travel of the glass holders 58. The closed portion of the loop is in the rear chamber 20 and at the ends of the tunnel 15, while the open portion is in the front chamber 19. One end of the track 66 terminates just beyond the entrance opening 29, extending downwardly in a rather abrupt angle as at 67; while the opposite end terminates just in advance of the discharge opening 30, extending downwardly in a more gentle slope as at 68.

With this arrangement the holders 58 will be held in raised position as they slide along the bar 66 during the return travel of the conveyor 16, and also while they are at the extreme ends of the tunnel 15. (See holders at the left in Figs. 3 and 4.) However, if the glass sheets have been properly positioned on the conveyor 16, as soon as they pass the entrance opening 29, a holder 58 will begin to slide down the inclined portion 67 of the track 66 and into engagement with the upper edge of the glass 47 to clamp it in position (Fig. 3).

Similarly, after the glass sheets have been washed, and as successive sheets approach the discharge opening 30, the rounded bottoms 63 of the glass holders that are clamping the sheets to the conveyor will be engaged one by one by the inclined portion 68 of the track to raise these holders out of the way and release the glass sheet for removal. The curved bottoms 63 on the holders 58 are to facilitate their movement along the track 66, particularly on the inclined portions, and the portion 67 of the track is given a relatively slight angle for the same reason and to prevent binding.

The machine of the invention may be divided into a loading section A, a washing section B, a rinsing section C, a drying section D, and an unloading section E. In operation the conveyor 16 is moving continuously, and sheets of glass to be washed are being continually introduced into the machine at 29 by an operator standing opposite the loading section A. Immediately after a sheet is engaged by one of the holding members 58 it begins to enter the washing section B where it passes between a series of vertical pipes 69 and is sprayed with the washing suspension that is projected onto both sides of the sheet simultaneously through the spray nozzles 70.

As pointed out above the preferred cleaning material is a suspension of fine particles of a material that will not injure the glass when impacted on its surface, in a liquid; which suspension is sprayed onto the glass with sufficient force to literally bombard the dirt from the glass or to break its bond with the surface so that the dirt can be carried away by the liquid in which the particles are suspended. The most satisfactory, commercially available materials so far discovered for this purpose are the hardwood flours; for example, palm nut shell flour, walnut shell flour and so forth, suspended in water.

No doubt other materials will be found that will also do the job; the principal requirements of a satisfactory substance being (1) that it not go into solution but remain in suspension in the water or other liquid used; (2) that it be hard enough to blast the dirt from the glass surface without being so hard as to scratch the surface when striking it with the necessary force; (3) that it have sufficiently low water absorption to prevent its becoming soft and soggy in use or expanding to the point where is will clog the spray nozzles and circulating system; (4) that it be sufficiently fine to pass readily through the system; and (5) that it not combine chemically with the water or other liquid to form a compound that will stain or otherwise deface the glass.

However, much the best agent found to date is the palm nut shell flour. This has the distinct advantage that it can be used with a hot water rinse, which makes for easier cleaning, and the material is readily available in the open market. It should be understood that under some circumstances, for instance when it is only desired to wash off a layer of parting material that has been put onto the glass sheets prior to bending to prevent their adhering to one another, and the sheets are otherwise clean, the machine can be used without the cleaning suspension. In some cases clear water will do, and in others water with a cleaning material will be sufficient. However, for dirt and any other difficult to remove foreign matter, the cleaning suspension, and preferably palm nut shell flour in water, should be used, either alone or with the addition of a cleaning material.

In any event the apparatus of this invention is not restricted to any specific cleaning agent, and the ones here discussed, together with the method of employing them, are more particularly described and claimed in the copending application of Joseph M. McGoldrick, Serial No. 588,792, filed April 17, 1945.

Figure 9:
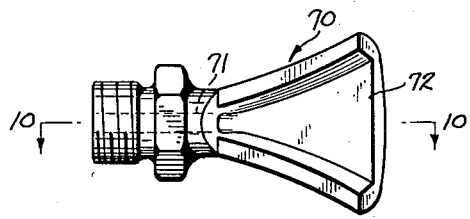
Fig. 9 is a full sized detail of one of the spray nozzles.
Figure 10:
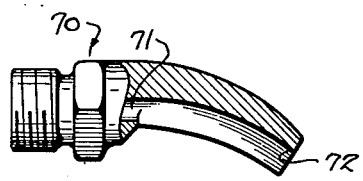
Fig. 10 is a section through the spray nozzle of Fig. 9, taken substantially on the line 10—10 in that figure.

As indicated above, as the glass sheets move through the washing section B they pass between the pipes 69 carrying the spray nozzles 70 and are bombarded by the particles of palm nut flour in suspension in water. The spray nozzles 70 are preferably fan shaped and slightly curved at their discharge ends as shown in Figs. 9 and 10. As a result the water issuing from the passage 71 in the nozzle will be discharged from the lip 72 of the nozzle as a thin, triangular, high velocity curtain or spray 73, which is thrown at the sheet at an angle other than a right angle to its path of travel. By turning a nozzle one way or the other in threading it into the pipe 69 the spray may be projected either toward the entrance or toward the discharge end of the machine. Usually it is desirable to point the first group of sprays toward the discharge end and the last group toward the entrance end so as to confine all of the spraying action of the pipes 69 within the washing section B.

The velocity with which the palm nut flour particles must strike the glass, the amount of flour in the water and the temperature of the sprayed material will depend to some extent on the amount of foreign material on the glass, and the tenacity with which it adheres to the sheet surface. However, for general purpose glass cleaning, spraying through an 1/8 inch diameter opening under 90 pounds pressure with the water at 140° F. has proved to be very satisfactory. As to the amount of palm nut flour, the present procedure is to first mix the flour into a thin water paste and eleven pails of this paste is then mixed with about 600 gallons of water to start the machine. The specific type of flour now being used is known as fine palm nut flour.

Figure 11:
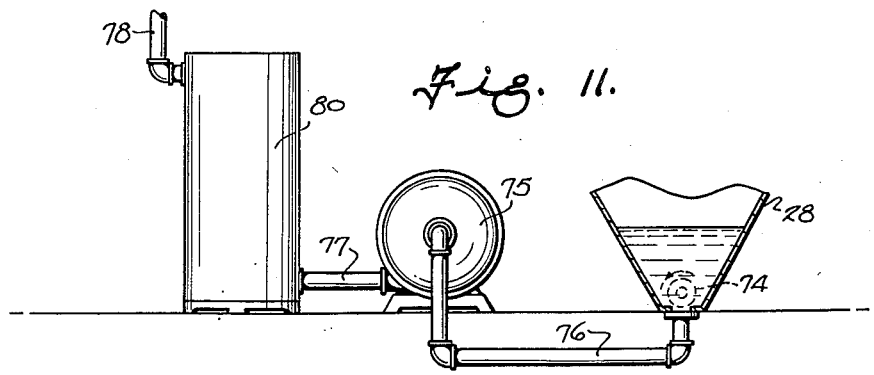
Fig. 11 is a diagrammatic view of a heat exchanger and pump set-up for heating and circulating the cleaning suspension.

The water suspension of palm nut flour employed is like a very thin slurry and is maintained in what amounts to a closed circulating system in the machine. That is, as the suspension or slurry is sprayed on the glass sheets from the nozzles 70, it drains down into the hopper-bottomed tank 28 (Figs. 4 and 11). A suitable type of agitator 74 is mounted within this tank and operates continuously to maintain the flour in suspension in the water. The nozzles 70 are supplied with spray material at the proper pressure by a pump 75 which pumps the material from the bottom of the tank 28, and through conduits 76 and 77, to the pipe 78 feeding the header 79. A heat exchanger 80 is interposed between conduits 77 and 78 to control the temperature of the cleaning suspension. In order to keep the amount of palm nut flour in the suspension up to the proper point, it has been found desirable to add from three to four pails of the flour and water paste to the system during the course of a normal day's operation.

It will be noted that pipes 81 leading from the header 79 to the spray pipes 69 are provided with hand valves 82, so that a larger or smaller number of spray pipes 69 can be placed in operation as is found necessary. The various conditions in the machine are so adjusted that by the time a glass sheet has moved out of the section A, all of the foreign material on its surface has been either knocked off the sheet or had its bond with the surface broken, and the major portion of the foreign matter has been carried away by the water in which the particles of palm nut flour are suspended.

The action of the tiny particles being thrown against the glass at high velocity while suspended in a liquid is really a physical and frictional action. In other words, with this technique the glass is actually being scrubbed, but without the use of any mechanical rubbing or brushing means. Consequently, any shape or surface can be treated, and every part of the surface reached and washed with a substantially uniform pressure.

From the washing section B, the sheet moves next into the rinsing section C. The pipes and spray nozzles in this section are preferably of the same construction as those in section B, but the nozzles in section C spray only clear liquid. The first group of pipes 83 spray hot water at about 90 pounds pressure onto the moving sheets to rinse off any loose dirt that has not been carried away by the water of the cleaning suspension in section B. From here the sheets pass between pipes 84 where they are sprayed with city water at line pressure, and then between pipes 85 where they are given a final rinse of condensate at low pressure.

Figure 7:
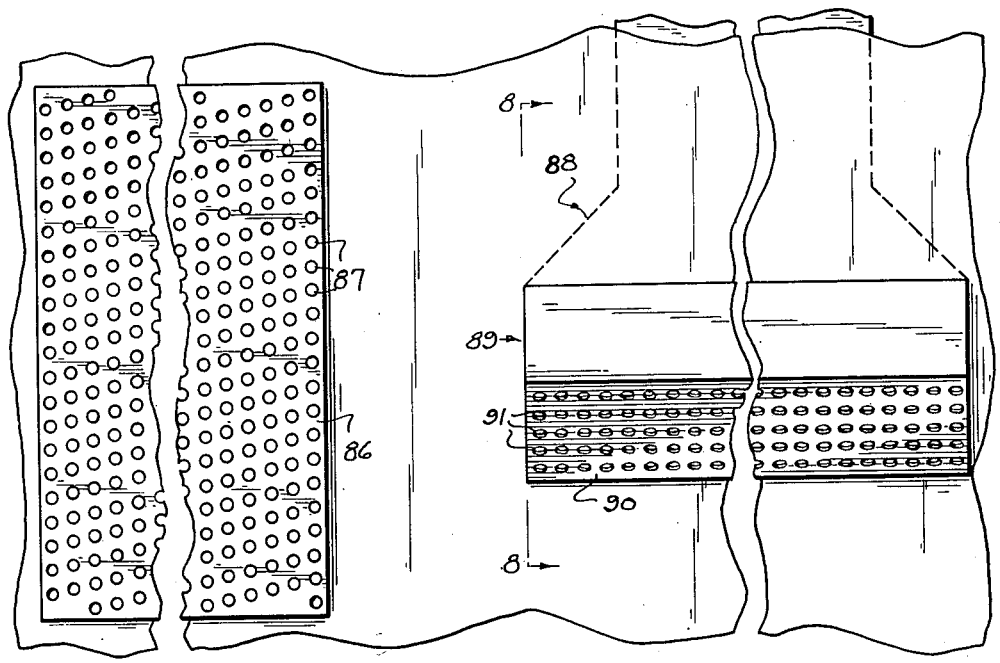
Fig. 7 is a front elevation of two of the hot air, drier heads looking in the direction of the arrows on the line 7—7 in Fig. 2.
Figure 8:
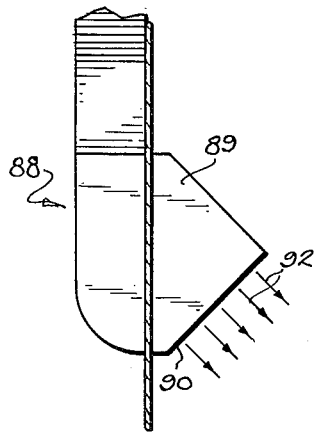
Fig. 8 is an end view of the drier heads looking in the direction of the arrows on the line 8—8 in Fig. 7.

When the glass sheets pass out of the section C they have been thoroughly washed and rinsed and are perfectly clean so that the next step is the drying step, and this is performed in section D by blowing heated air onto the glass surfaces. Various types of hot air blowers or pipes can be used for this purpose but hot air boxes of the sort shown in Figs. 2, 7 and 8 have proven themselves in actual practice. These are preferably used in pairs, the boxes of each pair being disposed oppositely to one another, as shown in Fig. 2. In one set-up, the sheets first pass between boxes 86 having flat rectangular faces provided with holes 87 through which heated air is blown onto both sides of the sheets simultaneously and over their entire surfaces. The holes 87 are preferably arranged in diagonal lines to give a more uniform drying action.

After passing between the boxes 86, the sheets will be practically dry but because of the tendency of the water to run downwardly on the sheet it has been found desirable to give an added drying treatment to the glass adjacent the bottom edge of the sheet to prevent water marks. For this purpose, a second pair of boxes 88 are made with a triangular shaped portion 89 extending into the chamber 19 (Fig. 8); and the downwardly directed face 90 of each of these boxes is provided with holes 91 for directing hot air downwardly in the direction of the arrows 92. These heated air jets will be directed at an angle along the lower margin of the glass to drive off and dry up any moisture that may still be adhering to the surfaces. The glass sheets 47 now continue to the end of the tunnel 15 where they are removed, perfectly clean and dry, through the opening 30.

It will be noted that there are located near the exit end of the tunnel 15 a pair of boxes 93 that are substantially the same construction as the boxes 86. Air is withdrawn from the chamber 19 through these two boxes and it is this same air that is returned and blown out onto the sheets through the openings in the boxes 86 and 88. This is done for a twofold reason. First, the air drawn from the chamber 19 is already heated so that it is only necessary to raise its temperature to the point desired, and this can be easily done by suitable heating means (not shown) associated with the blowers 94, that are interposed in the conduits 95 running between the intake and outlet boxes. Second, the fact that air is being continuously withdrawn from the chamber 19 through the boxes 86, 93, and 88, will set up a constant flow of heated air through the drying section D.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim:

1. In sheet glass washing apparatus wherein a glass sheet is conveyed along a definite horizontal path and sprayed with cleaning material during travel along said path, an endless conveyor of substantially L shape in cross section, means on the horizontal portion of the L for supporting one edge of a glass sheet and means on the vertical portion of the L against which another portion of said sheet rests so that the sheet is supported at an angle between the horizontal and vertical portions of the L, glass holding means slidable on the vertical portion of the conveyor, track means for maintaining said holder in raised position relative to the conveyor and for guiding the holder downwardly into contact with a glass sheet on the conveyor and for subsequently guiding it upwardly out of engagement with said sheet and into said raised position, and means for driving the conveyor.

2. In sheet glass washing apparatus, an endless conveyor substantially L shaped in cross section and including means for freely supporting a sheet at an angle thereon, glass holding means movable into and out of engagement with glass sheets on the conveyor for retaining them in position thereon, means for spraying cleaning material on the surface of said glass as it is moved along by the conveyor, means for spraying rinsing liquid onto said sheets, and means for drying the same including means for blowing hot air over the entire surface of the sheet and means for blowing additional hot air onto said sheet at an angle other than a right angle thereto and toward one edge thereof.

3. In a sheet glass cleaning apparatus including a washing section wherein a glass sheet is conveyed along a definite horizontal path and sprayed with cleaning material during travel along said path, an endless conveyor of substantially L shape in cross section, means on the horizontal portion of the L for supporting one edge of a glass sheet and means on the vertical portion of the L against which another portion of said sheet rests so that the sheet is supported at an angle between the horizontal and vertical portions of the L, glass holding means slidably associated with the vertical portion of the conveyor and movable into and out of engagement with glass sheets on the conveyor for retaining them in position thereon, means for bringing said glass holding means into engagement with the sheets before they enter the washing section of the machine, and means for moving the holding means out of engagement with the glass sheets after they leave said washing section.

4. In sheet glass washing apparatus wherein a glass sheet is conveyed along a definite horizontal path and sprayed with cleaning material during travel along said path, an endless conveyor of substantially L shape in cross section, means on the horizontal portion of the L for supporting one edge of a glass sheet and means on the vertical portion of the L against which another portion of said sheet rests so that the sheet is supported at an angle between the horizontal and vertical portions of the L, and glass holding means including a body portion slidable on the vertical portion of the conveyor and a rod-shaped member extending outwardly from said body portion and adapted to engage an edge of the glass sheets on the conveyor for maintaining them in position thereon.

5. In sheet glass washing apparatus wherein a glass sheet is conveyed along a definite horizontal path and sprayed with cleaning material during travel along said path, an endless conveyor including a pair of horizontally arranged sprockets, a chain trained about said sprockets, members substantially L shaped in cross section suspended from said chain, means on the horizontal portions of said members for supporting one edge of a glass sheet and means on the vertical portions against which another portion of said sheet rests so that the sheet is supported at an angle between the horizontal and vertical portions of the L, means associated with the lower portions of said sheet supporting members for guiding them along a predetermined path, means for guiding and supporting the chain, means for driving said chain through one of said sprockets, and glass holding means movable into and out of engagement with the glass sheets on the conveyor for retaining them in position thereon.

6. In sheet glass washing apparatus wherein a glass sheet is conveyed along a definite horizontal path and sprayed with cleaning material during travel along said path, an endless conveyor of substantially L shape in cross section, the horizontal portion of said L including two spaced parallel rod-like members and glass sheet supporting pads removably mounted on said members, and means for driving said conveyor.

7. In sheet glass washing apparatus wherein a glass sheet is conveyed along a definite horizontal path and sprayed with cleaning material during travel along said path, an endless conveyor of substantially L shape in cross section, means on the horizontal portion of the L for supporting the lower edge of a glass sheet and means on the vertical portion upon which another portion of said sheet rests so that the sheet is supported at an angle between the horizontal and vertical portions of the L, and glass holding means including a rod member movable into and out of engagement with the upper edge of the glass sheets on the conveyor for retaining them in position thereon.

EMMETT L. WALTERS.

REFERENCES CITED

The following references are of record in the file of this patent:

UNITED STATES PATENTS

| Number | Name | Date |
| --- | --- | --- |
| 1,045,079 | Prunier | Nov. 19, 1912 |
| 1,411,380 | Roof | Apr. 4, 1922 |
| 1,564,317 | Blades | Dec. 8, 1925 |
| 1,566,251 | Myers | Dec. 15, 1925 |
| 1,674,064 | Ridley | June 19, 1928 |
| 1,677,320 | Anstiss | July 17, 1928 |
| 1,687,844 | Miller | Oct. 16, 1928 |
| 1,692,812 | Blakeslee | Nov. 27, 1928 |
| 1,694,734 | Cutler | Dec. 11, 1928 |
| 1,979,504 | Tafel | Nov. 6, 1934 |
| 2,060,144 | Vincent | Nov. 10, 1936 |
| 2,094,398 | Dostal | Sept. 28, 1937 |
| 2,250,238 | Smith | July 22, 1941 |
| 2,275,664 | Whitney | Mar. 10, 1942 |
| 2,367,652 | Trier et al. | Jan. 16, 1945 |
| 2,372,599 | Nachtman | Mar. 27, 1945 |